United States Patent
Pan et al.

(10) Patent No.: US 7,859,212 B2
(45) Date of Patent: Dec. 28, 2010

(54) ELECTRIC DRIVE SYSTEM WITH REDUNDANCY

(75) Inventors: Zhiguo Pan, Rowland Heights, CA (US); Daniel M. Saban, Corona, CA (US); Raed Ahmad, Placentia, CA (US)

(73) Assignee: Direct Drive Systems, Inc., Fullerton, CA (US)

( * ) Notice: Subject to any disclaimer, the term of this patent is extended or adjusted under 35 U.S.C. 154(b) by 398 days.

(21) Appl. No.: 12/074,118

(22) Filed: Mar. 3, 2008

(65) Prior Publication Data

US 2009/0218977 A1    Sep. 3, 2009

(51) Int. Cl.
   *G05B 5/00*      (2006.01)

(52) U.S. Cl. .................. 318/445; 318/34; 318/400.2
(58) Field of Classification Search ................. 318/445, 318/480, 34, 400.2, 400.17, 466, 280, 400.13, 318/599, 601, 604; 363/159
See application file for complete search history.

(56) References Cited

U.S. PATENT DOCUMENTS

2006/0267091 A1*  11/2006  Takahashi ................... 257/341

\* cited by examiner

*Primary Examiner*—Karen Masih
(74) *Attorney, Agent, or Firm*—Irving Keschner

(57) ABSTRACT

Circuit configurations for controlling an AC motor drive system wherein the control systems include redundancy features to compensate for possible failed system components.

14 Claims, 12 Drawing Sheets

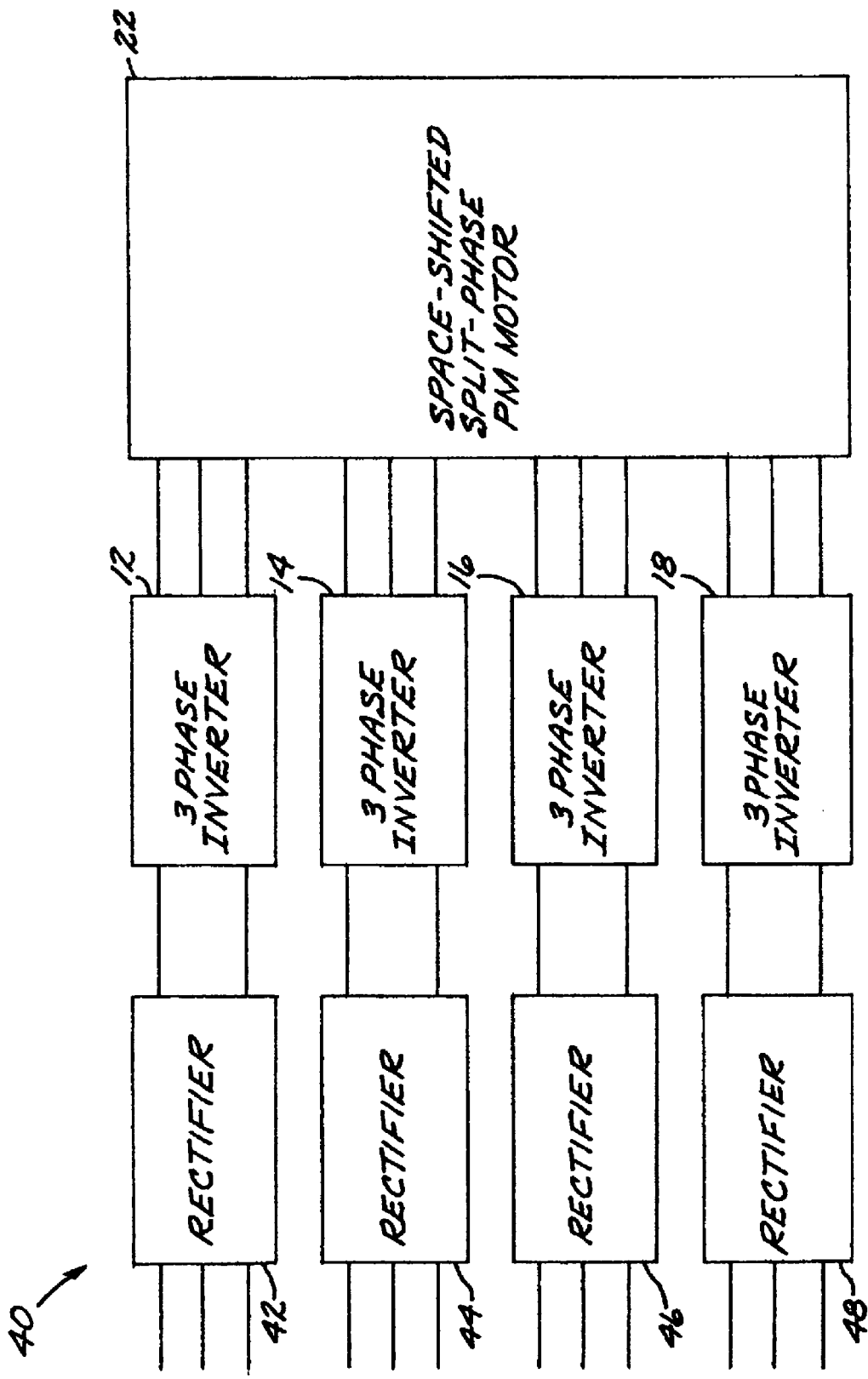

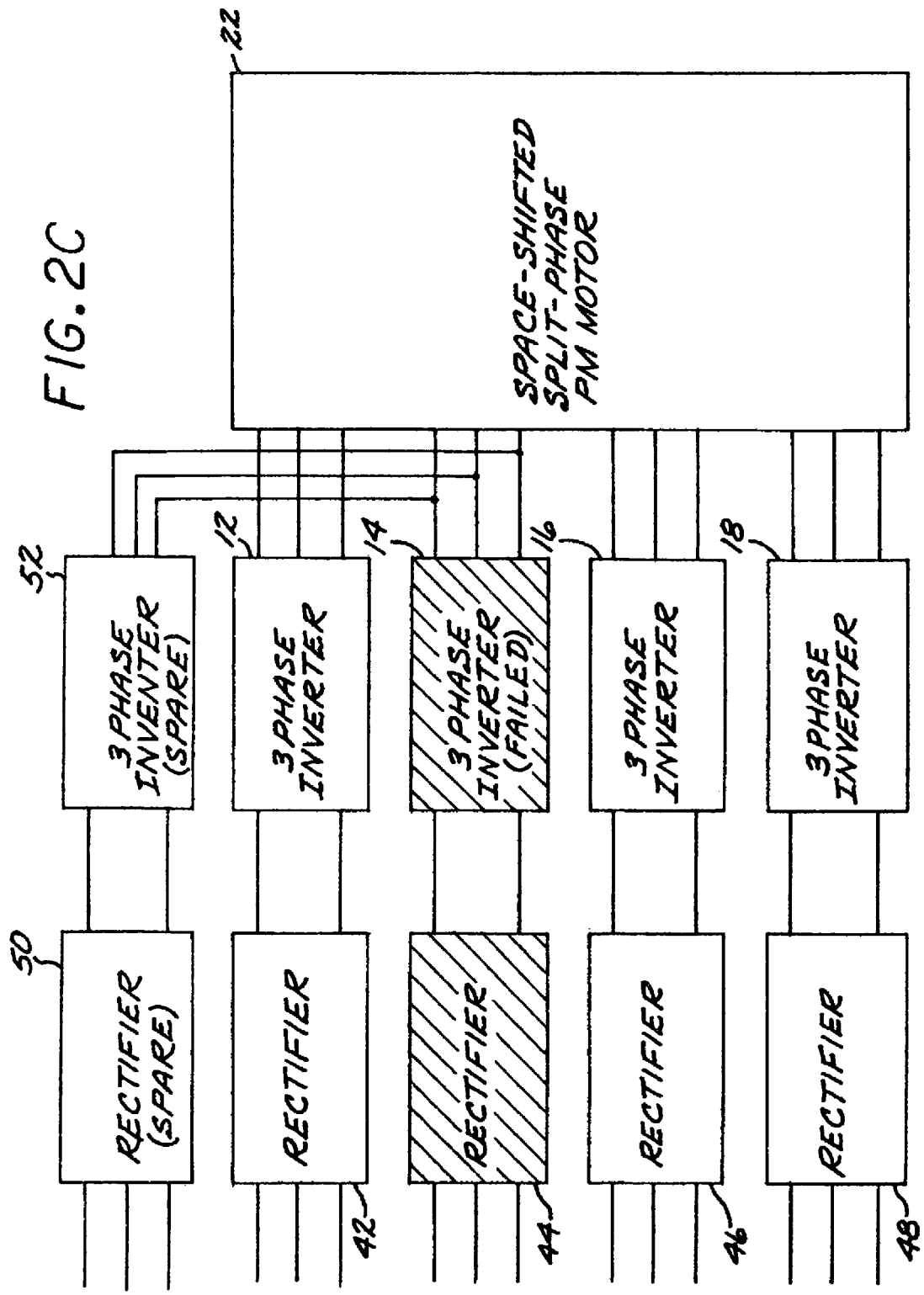

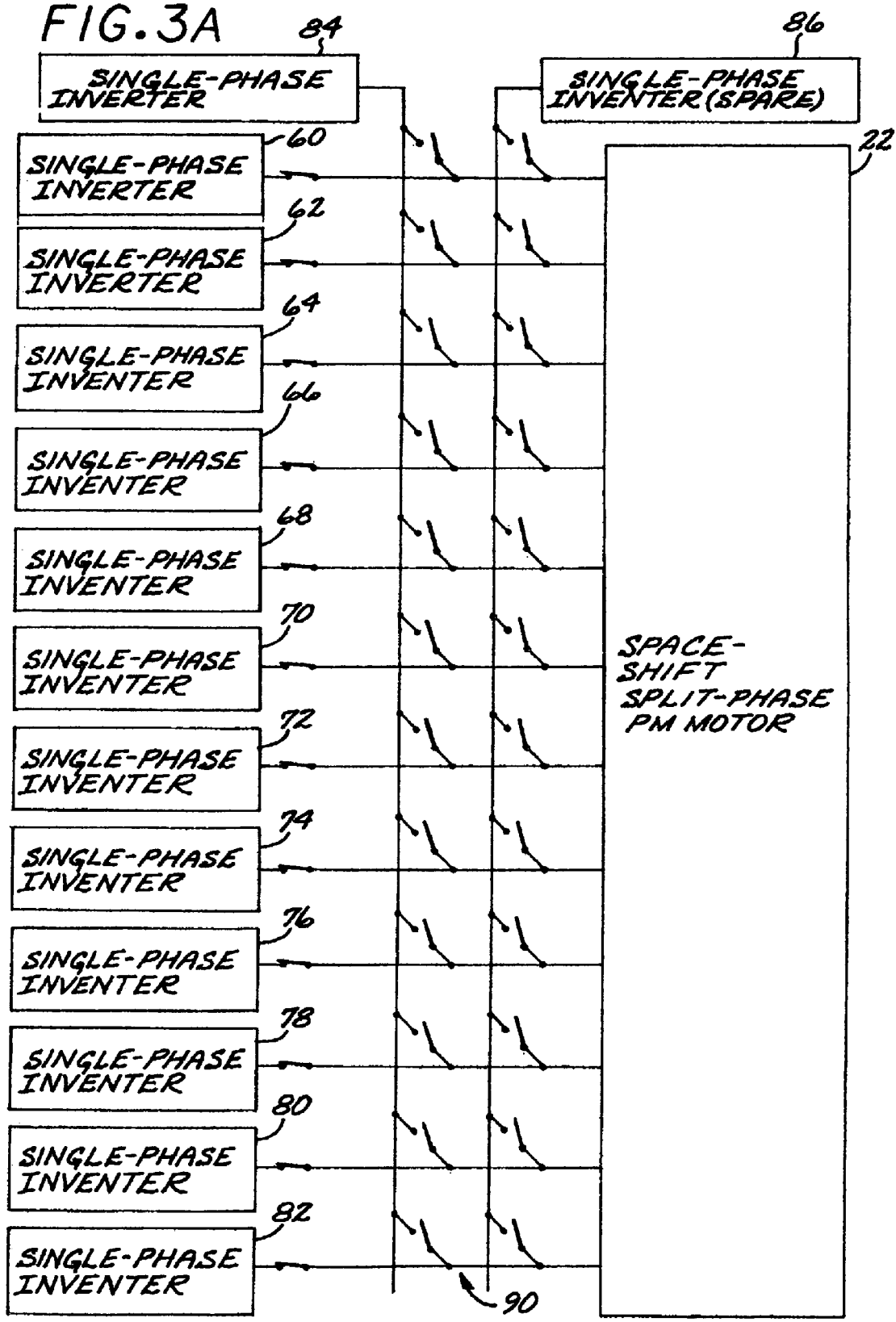

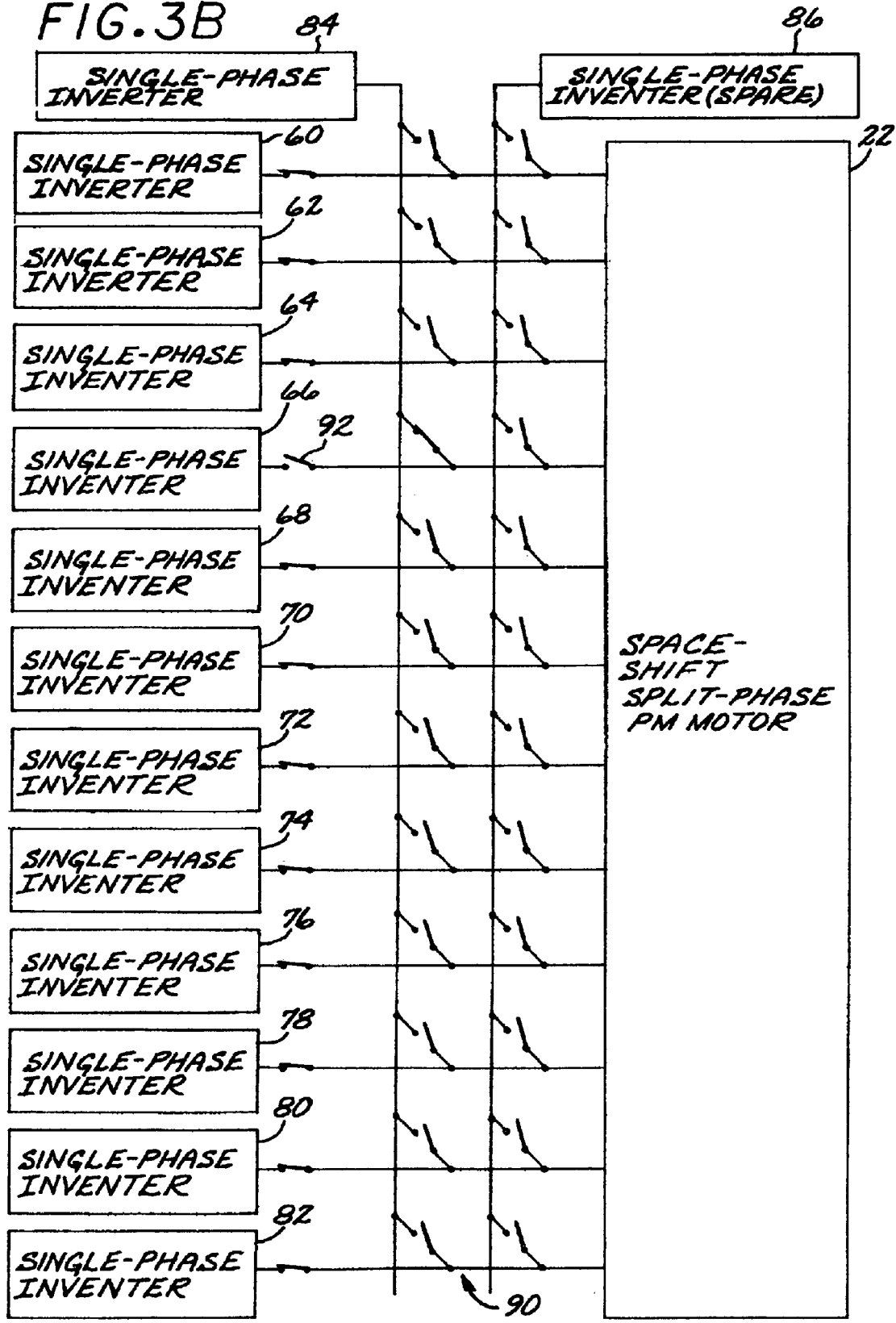

ELECTRIC DRIVE SYSTEM WITH REDUNDANCY

BACKGROUND OF THE INVENTION

1. Field of the Invention

The present invention provides a system for controlling an electric machine and providing redundancy for system components.

2. Description of the Prior Art

In a conventional power system, high speed motors are directly coupled to high speed machinery and controlled by a high frequency output, pulse width modulation based, AC drives. However, the size, weight, efficiency, operating costs and system availability of the drive systems make the high speed motors not widely utilized.

SUMMARY OF THE INVENTION

The present invention provides a system for controlling a space-shifted, split-phase stator AC motor drive system. The following topologies have been developed to implement the above control system:

1. An AC motor drive system wherein a dc/ac inverter is divided into N number of inverter modules; a control strategy that allows a single inverter to go off-line and the power output on the each remaining module increased by 1/(N−1); a spare inverter and all of the active inverters tied into a switch matrix; upon a failure, the faulted sub-module is taken off-line and the spare is switched in its place.

2. An AC motor drive system where the ac/dc rectifier is divided into N number of rectifier modules; a control strategy that allows one module to go off-line and the power output on the remaining modules increased by 1/(N−1); a spare module and all of the active modules tied into a switch matrix; upon a failure, the faulted module is taken off-line and the spare is switched in its place.

3. The 3-phase sub-modules previously described are further reduced to single phase sub modules (also known as phase modules). Since the spare module is identical to the sub modules in the system, the smaller and lower cost of the submodules means a lower overall cost increase for the redundant system.

4. The command and control features that are part of the present invention are as follows: The control scheme for sub-modules utilize gate signals which are phase-shifted accordingly, based on the phase-shift of the corresponding winding. The sub-modules have the same current waveform with a 60/N degree time delay. Because of the symmetric current waveform and combination of the waveform time-shift and winding space-shift, the harmonics are cancelled out and result in a more sinusoidal magnetic flux in the air gap of the machine.

5. A centralized control configuration where a central controller synchronizes with the machine and controls all sub-modules.

6. A master-slave configuration where each power inverter sub-module has its own controller. In addition, a controller serves as the master control and synchronizes with the machine, and other controllers synchronize with master controller via a high-speed data link loop. Since all the controllers are identical, the role of the master controller can be rotated between all the modules. When one controller fails, the next controller will be picked up and serve as the master controller and keep the system running.

7. An independent-sync configuration where each module synchronizes independently to the electric machine. When one controller fails, the rest of the controllers will share the load of the failed sub-module.

DESCRIPTION OF THE DRAWINGS

For a better understanding of the present invention as well as other objects and further features thereof, reference is made to the following description which is to be read in conjunction with the accompanying drawing wherein the sole figure illustrates the system of the present invention.

FIG. 2A shows a space-shifted, split-phase stator AC motor drive system wherein the dc/ac rectifier is divided into modules;

FIG. 2C illustrates a configuration wherein a spare module and the remaining modules are coupled to a switch matrix;

FIG. 3A illustrates a system wherein 3-phase sub-modules are reduced to a single phase module;

FIG. 3B illustrates how the spare inverter shown in FIG. 3A is inserted into the system when a single-phase inverter fails;

DESCRIPTION OF THE INVENTION

Figure 1A:
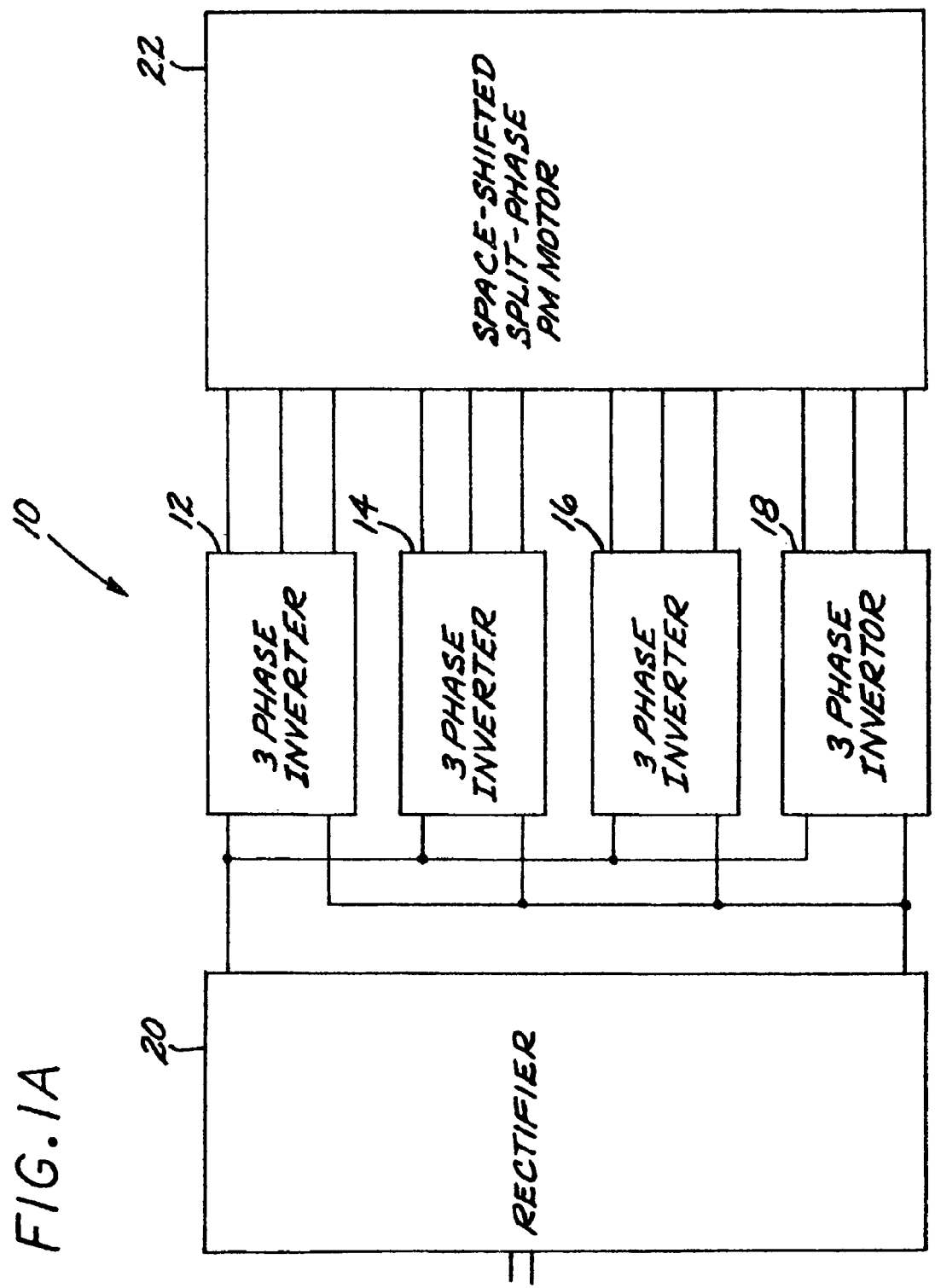
FIG. 1A shows a space-shifted, split-phase stator AC motor drive system where the dc/ac inverter is divided into a plurality of inverter modules.

Referring now to FIG. 1A, a space-shifted, split-phase stator motor drive system 10 is illustrated and wherein the dc/ac inverter disclosed in co-pending application Ser. No. 11/751,450, now U.S. Pat. No. 7,710,081 issued on May 4, 2010, filed May 21, 2007 and assigned to the assignee of the present invention, is replaced with N number of three phase inverter modules 12, 14 . . . 18 (in this example, N equals 4). The output of rectifier 20 is coupled to the inputs of the inverter modules as shown. The output of the inverter modules are coupled to space-shifted split phase motor 22.

Figure 1B:
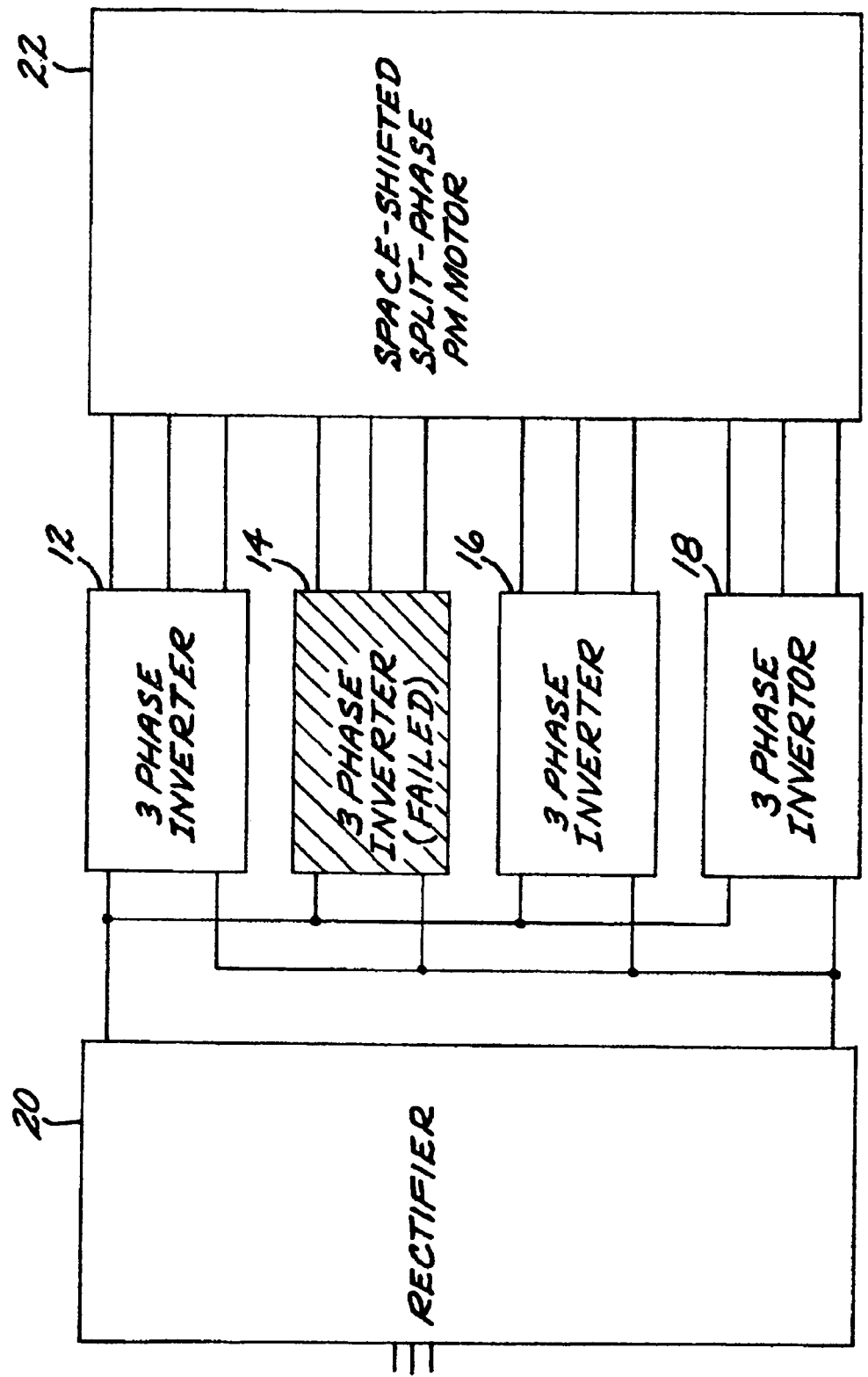
FIG. 1B illustrates a motor drive system that allows a single inverter to go off-line while increasing the power on the remaining system inverters.

FIG. 1B is similar to FIG. 1A and illustrates the situation wherein 3 phase inverter 14 fails; in this case, the system is designed to increase the power output from operating inverter modules 12, 16 and 18 by 1/(N−1).

Figure 1C:
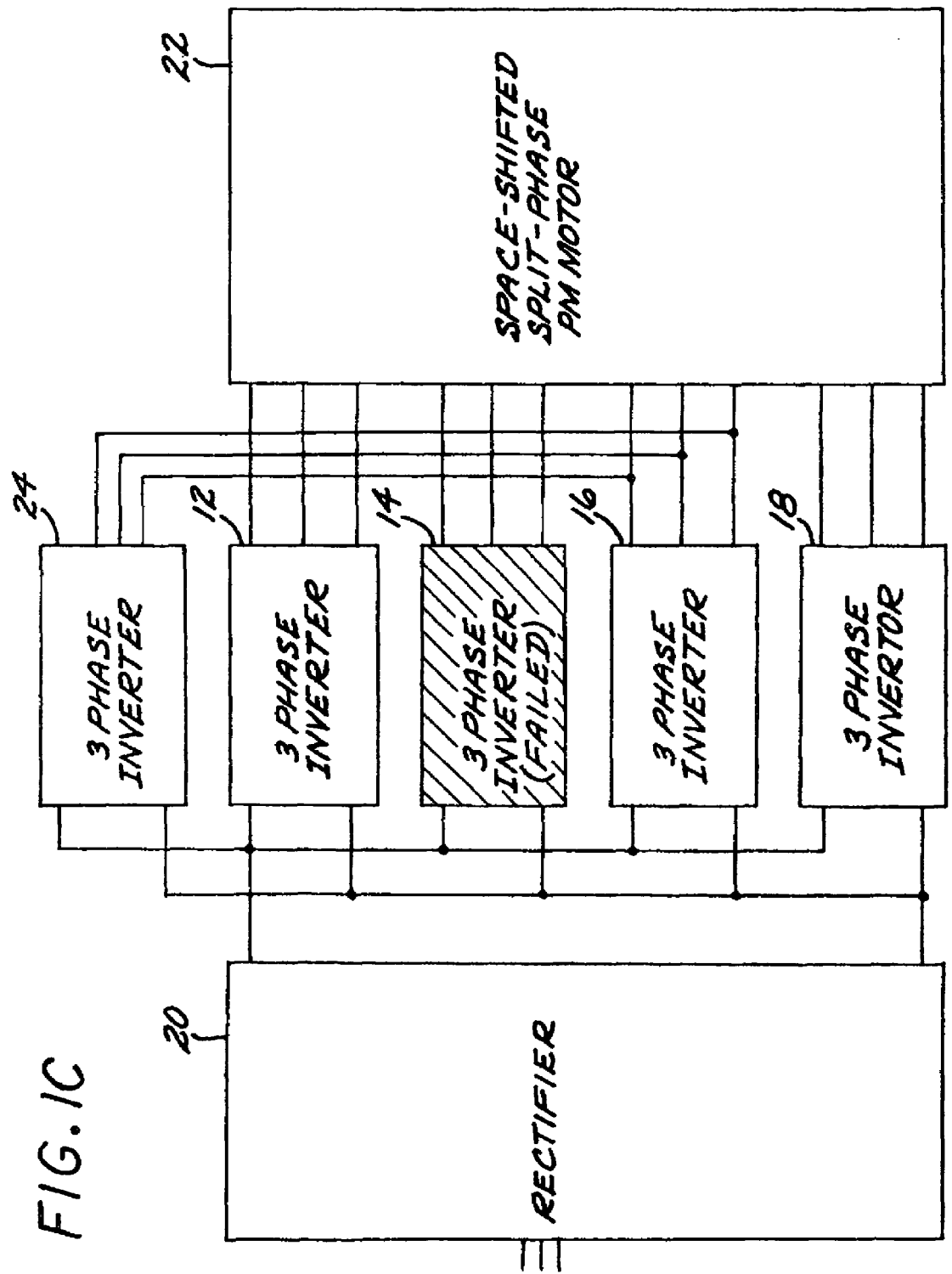
FIG. 1C illustrates a spare inverter and active inverters coupled to a switch matrix.

FIG. 1C is similar to FIG. 1B with the addition of a spare inverter module 24. The active inverter modules 12, 14, 16 and 18 are connected to a switch matrix for connecting spare 3 phase inverter 24 into the power system if one of the active inverter modules fails. In the example illustrated in the figure, inverter 14 has failed and spare inverter 24 is switched into the system to replace failed inverter 14.

FIG. 2A shows a space-shifted, split-phase stator AC motor drive system 40 wherein the single ac/dc rectifier 20 of FIGS. 1A-1C is replaced with rectifier modules 42, 44, 46 and 48. Each rectifier/inverter combination is separate from the others.

Figure 2B:
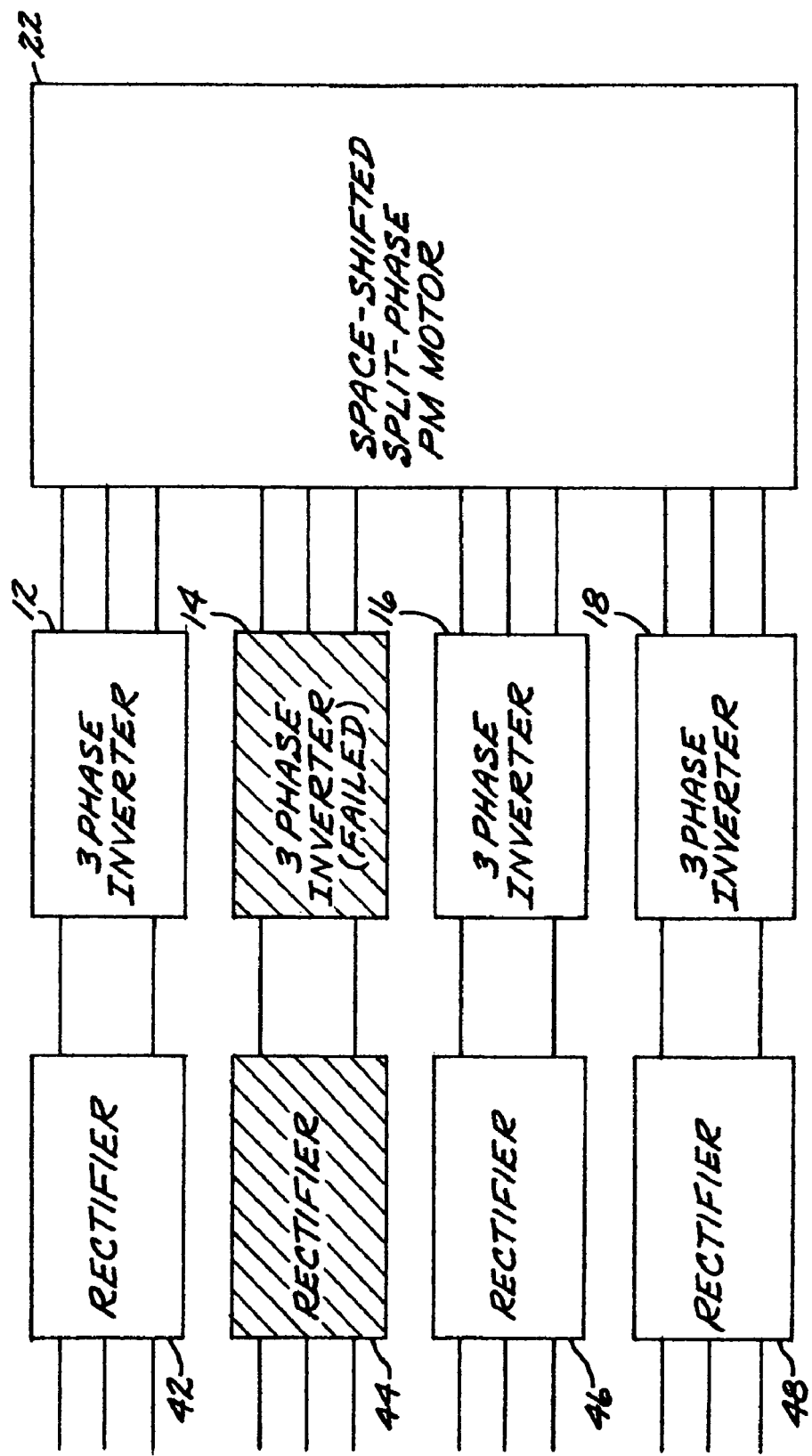
FIG. 2B illustrates a system that enables a single module to be off-line while raising the power to the remaining modules.

FIG. 2B illustrates the situation wherein phase inverter 14 fails; the power output on independent modules is increased by a third {1/(N−1)}. In this case, rectifier 44 is also removed from the system.

FIG. 2C shows a system similar to that of FIG. 2B with the addition of spare rectifier 50 and spare inverter 52. In the example illustrated, when inverter 14 fails, rectifier 50 and inverter 52 are switched into the system in place of faulted modules 14 and 44. All the active inverter modules are connected into a switch matrix.

FIG. 3A illustrates a system wherein the three phase inverter modules of FIGS. 1A-1C and 2A-2C are reduced to single phase sub-module inverters 60, 62 ... 82 (twelve total). Two spare single phase inverter modules 84 and 86 are provided and can be switched into the system by matrix 90 when any active inverter module fails. Switch matrix 90 comprise bi-directional switch components which can be relays, contactors, bi-directional gate turn-off (GTO) thyristors or anti-parallel silicon controlled rectifiers (SCR).

FIG. 3B illustrates the situation wherein the single phase inverter 66 of FIG. 3A fails; in this case, switch 92 is opened to isolate inverter 66 and spare 84 is connected into the circuit instead of inverter 66 and applying power to motor 22. The system further illustrates that additional spare inverters, such as inverter 86, can be connected to the circuit in case of two inverters failing at the same time. Furthermore, more spare modules can be added to the system to further increase redundancy features of the invention.

Figure 4:
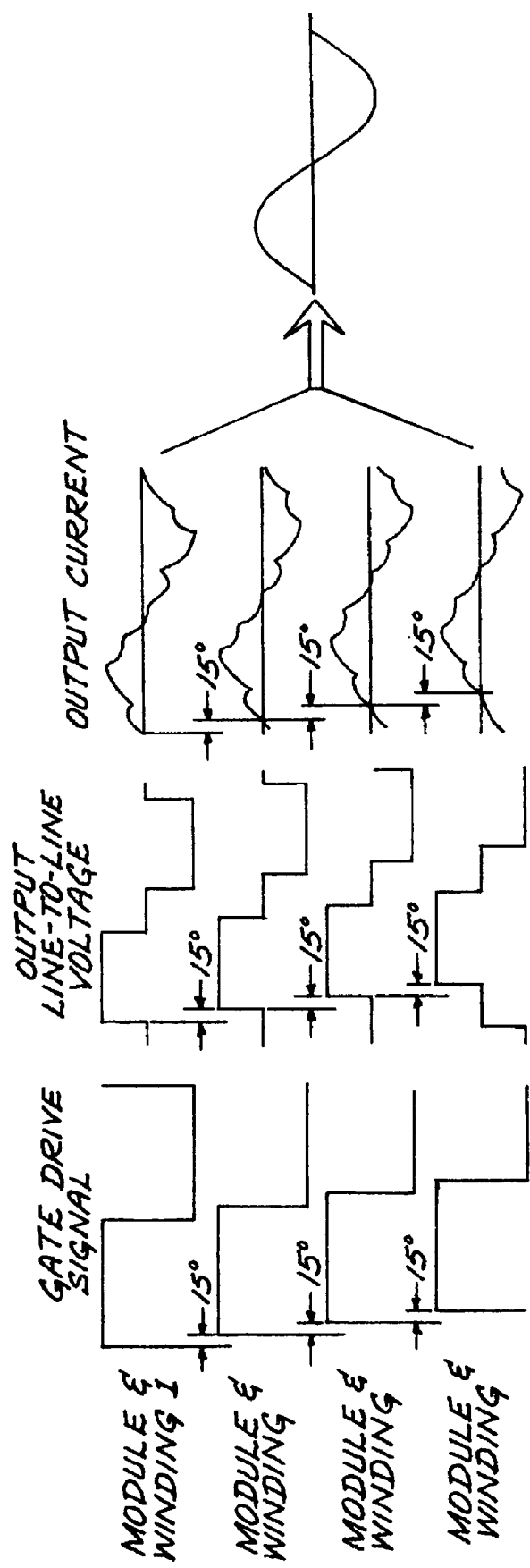
FIG. 4 illustrates the gate signals which control the system inverters.
Figure 5:
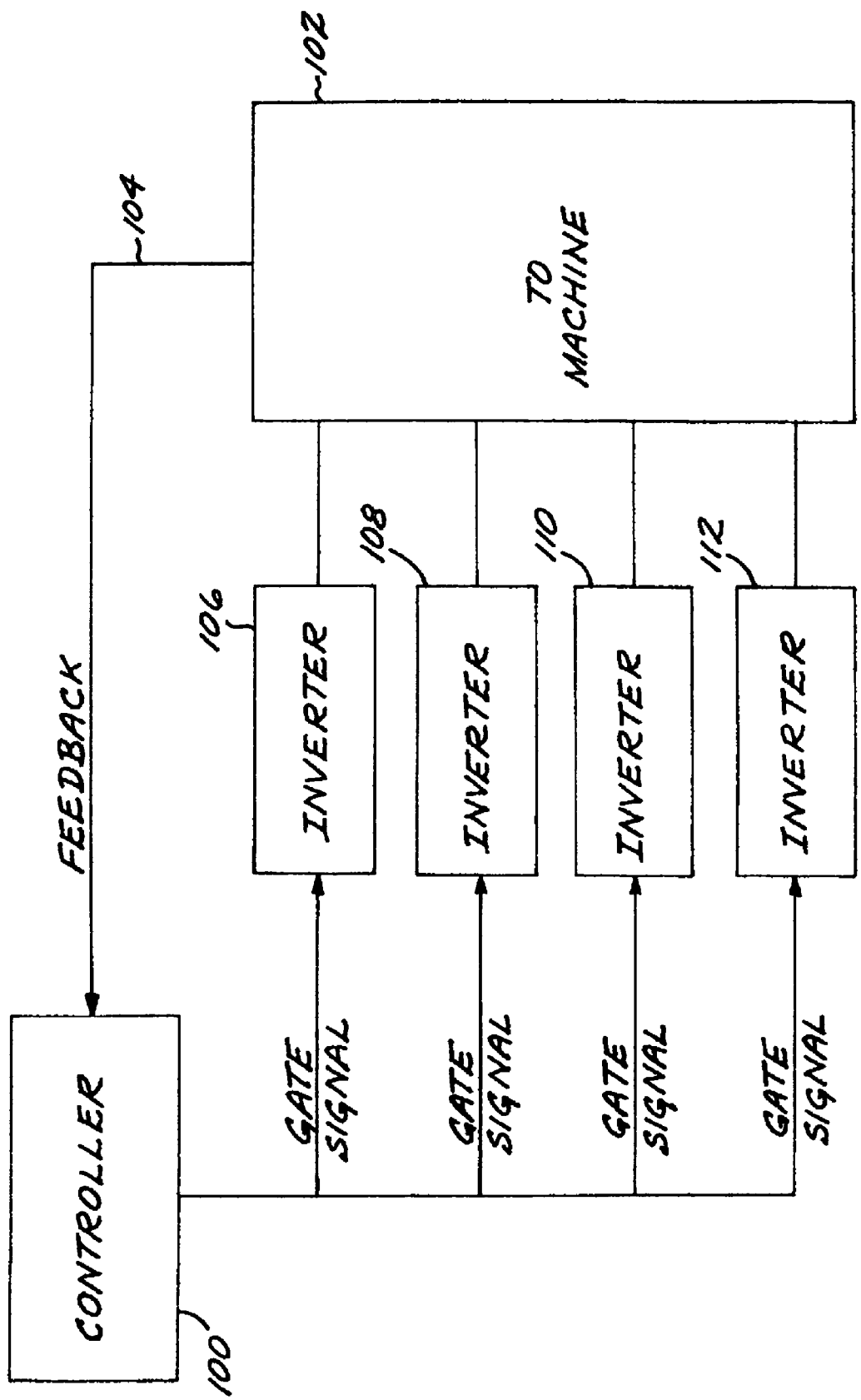
FIG. 5 shows a centralized control configuration wherein a central controller controls all the system sub-modules.
Figure 6:
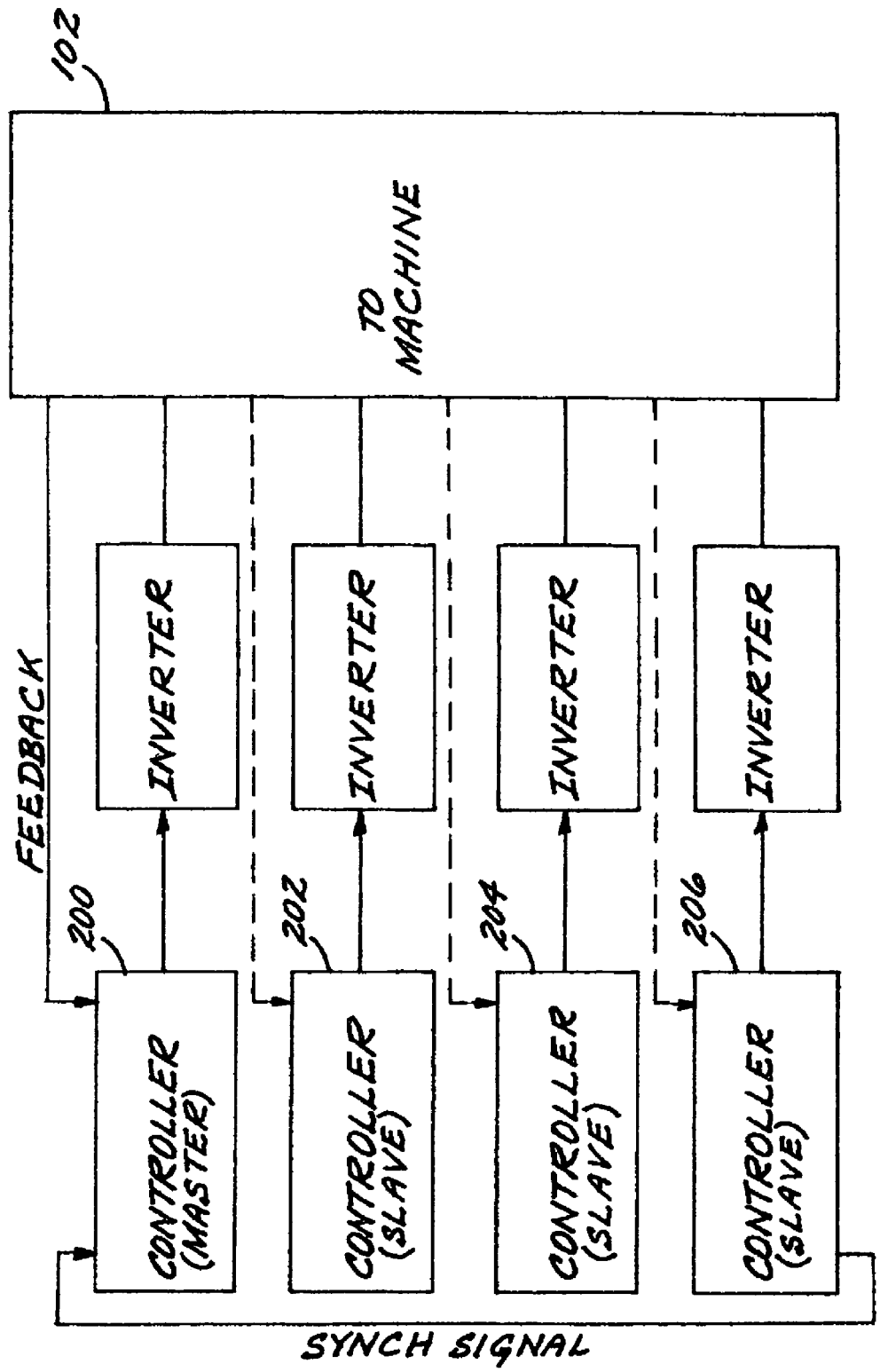
FIG. 6 shows a master-slave configuration wherein each inverter has its own controller.
Figure 7:
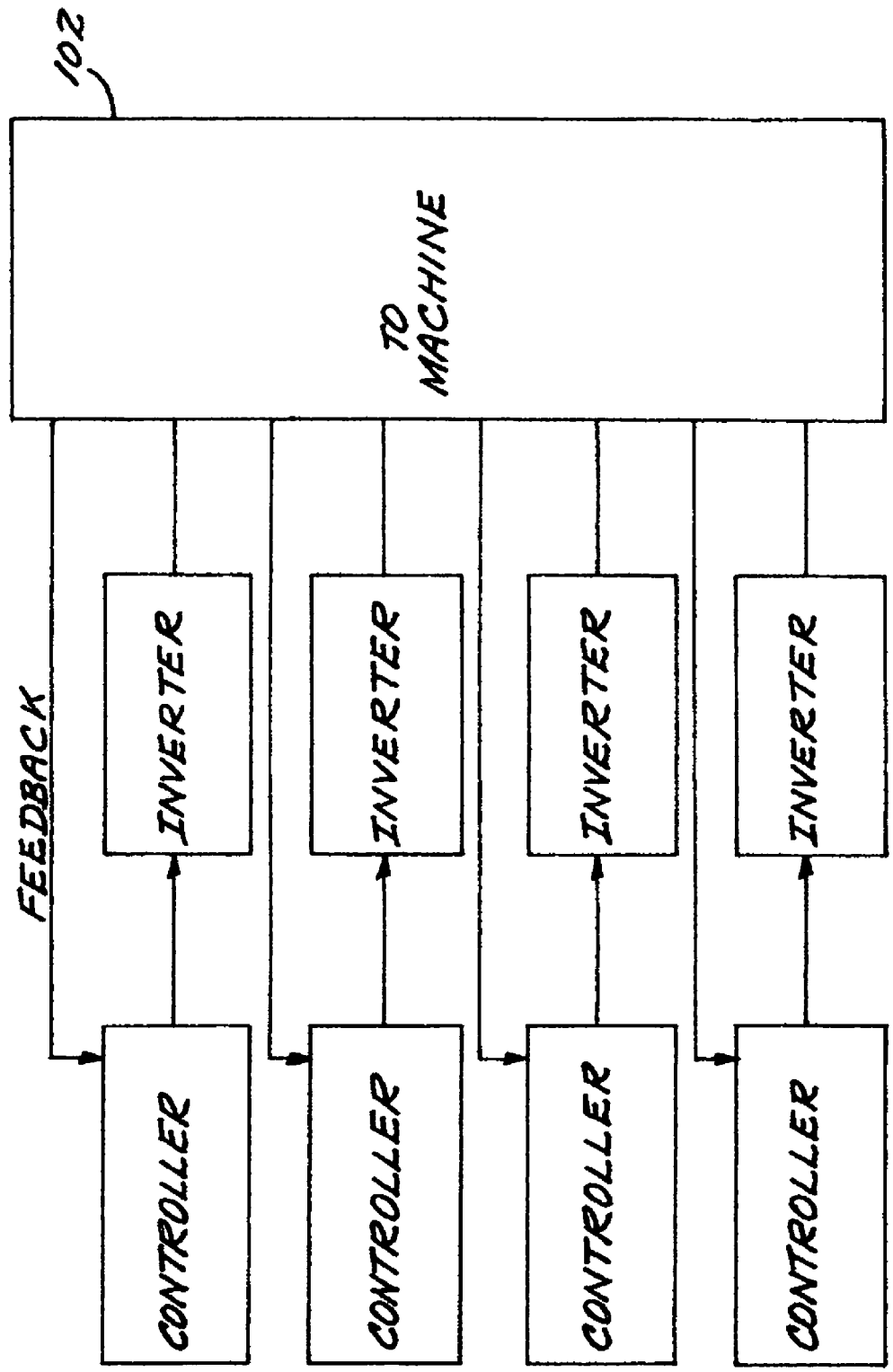
FIG. 7 illustrates a distributed controller configuration wherein each module synchronizes independently to the motor.

FIG. 4 illustrates the gate signals that will control the inverters shown in FIGS. 5-7. The gate signals for the inverter sub modules will be phase-shifted accordingly, based on the phase-shift of the corresponding winding. In the example illustrated, N (number of windings on motor) is four, the phase-shift being calculated by dividing 60 by N, 15 degrees in this case. The output voltages of each sub-module are also phase-shifted by 15 degrees, the sub-modules thus having the same current waveform with a 15 degree time delay. Because of the symmetric current waveform and combination of time-shift and space-shift, the harmonics are cancelled where results in a sinusoidal signal to the motor and a resultant sinusoidal flux.

FIG. 5 shows a centralized control system wherein central controller 100 synchronizes with machine 102 via feedback lead 104 and controls inverter sub-modules 106, 108 ... 112.

FIG. 6 illustrates a master-slave configuration wherein each inverter has its own controller. In the example illustrated, controller 200 serves as the master controller and synchronizes with machine 102. Slave controllers 202, 204 and 206 synchronize with master controller 200 via a high speed data loop. Since all the controllers are identical, the function of master controller 20 can be alternated between all the modules. If one controller fails, the next controller will function as the master controller and maintain system operation.

FIG. 7 illustrates an independent synchronization configuration system wherein each inverter module synchronizes independently to machine 102. In this configuration, a data bus is used to communicate between the drive and system level controller. If one controller fails, the rest of the controller will pick up the load and maintain system operation.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A high-speed drive system comprising:
   an AC electrical motor with N sets of spaced-shifted m-phase windings, wherein each winding is shifted by $\pi/(m*N)$ from the adjacent winding;
   a modular drive system with N active converter modules with a shared dc bus, each converting module connecting to and powering one polyphase winding of said electrical motor;
   a plurality of spare converter modules; and
   a switching matrix that isolates a failed active module and switches a selected spare module into said modular drive system when an active module fails.

2. A high-speed drive system comprising:
   an AC electrical motor with N sets of spaced-shifted m-phase windings, wherein each winding is shifted by $\pi/(m*n)$ from the adjacent winding;
   a modular drive system with N active modules each with an independent rectifier coupled thereto, each rectifier connecting to and powering one polyphase winding of the electrical motor;
   a plurality of spare converter modules; and
   a switching matrix that isolates a failed active module and switches a selected spare module into said modular drive system when an active module fails.

3. A high-speed drive system comprising:
   an AC electrical motor with N sets of spaced-shifted m-phase windings, wherein each winding is shifted by $\pi(m*N)$ from the adjacent winding;
   a modular drive system having a plurality of single phase active converter modules, each active converter module connecting to and powering one phase winding of said electrical motor;
   a plurality of spare converter modules; and
   a switching matrix that isolates the failed module and/or switches the spare module into the circuit when any active module fails.

4. The drive system of claims 1, 2 or 3 further including a controller having a centralized processor for sending time-shift controller gate signals to said active and spare converters modules.

5. The drive system of claims 1, 2 or 3 further including a distributed controller system for controlling said modular drive systems and which comprises a plurality of controllers, each of said controllers controlling a single converter module.

6. The drive system of claim 1 further including a distributed controller system for controlling said modular drive systems and which comprises a plurality of controllers, each of said controllers controlling a single converter module, one controller serving as a master controller, the remaining controllers being synchronized with said master controller.

7. The drive system of claim 2 further including a distributed controller system for controlling said modular drive systems and which comprises a plurality of controllers, each of said controllers controlling a single converter module, one controller serving as master controller, the remaining controllers being synchronized with said master controller.

8. The drive system of claim 3 further including a distributed controller system for controlling said modular drive systems and which comprises a plurality of controllers, each of said controllers controlling a single converter module, one controller serving as master controller, the remaining controllers being synchronized with said master controller.

9. The drive system of claim 1 further including a distributed controller system for controlling said modular drive systems and which comprises a plurality of controllers, each of said controllers controlling a single converter module, one controller serving as a master controller, the remaining controllers being synchronized with said master controller, said master controller being capable of automatically handed over to a different controller when the master controller fails or resets in order to maintain operation.

10. The drive system of claim 2 further including a distributed controller system for controlling said modular drive systems and which comprises a plurality of controllers, each of said controllers controlling a single converter module, one controller serving as a master controller, the remaining controllers being synchronized with said master controller, said master controller being capable of automatically handed over to a different controller when the master controller fails or resets in order to maintain operation.

11. The drive system of claim 3 further including a distributed controller system for controlling said modular drive systems and which comprises a plurality of controllers, each of said controllers controlling a single converter module, one controller serving as a master controller, the remaining controllers being synchronized with said master controller, said master controller being capable of automatically handed over to a different controller when the master controller fails or resets in order to maintain operation.

12. The drive system of claim 1 further including a distributed controller system for controlling said modular drive systems and which comprises a plurality of controllers, each of said controllers controlling a single converter module independently and having the capability of picking up the load when another controller failed.

13. The drive system of claim 2 further including a distributed controller system for controlling said modular drive systems and which comprises a plurality of controllers, each of said controllers controlling a single converter module independently and having the capability of picking up the load when another controller failed.

14. The drive system of claim 3 further including a distributed controller system for controlling said modular drive systems and which comprises a plurality of controllers, each of said controllers controlling a single converter module independently and having the capability of picking up the load when another controller failed.

* * * * *